US012755429B2

(12) United States Patent
Sumitani et al.

(10) Patent No.: US 12,755,429 B2
(45) Date of Patent: Oct. 6, 2026

(54) ATTITUDE DETERMINING DEVICE, VEHICLE LAMP SYSTEM, ATTITUDE DETERMINING METHOD, AND CALIBRATION METHOD

(71) Applicant: Koito Manufacturing Co., Ltd., Tokyo (JP)

(72) Inventors: Hiroki Sumitani, Shizuoka (JP); Atsumi Suzuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 87 days.

(21) Appl. No.: 18/808,222

(22) Filed: Aug. 19, 2024

(65) Prior Publication Data

US 2024/0412417 A1 Dec. 12, 2024

Related U.S. Application Data

(63) Continuation of application No. PCT/JP2023/007652, filed on Mar. 1, 2023.

(30) Foreign Application Priority Data

Mar. 15, 2022 (JP) ................................ 2022-040365

(51) Int. Cl.
*G01B 11/26* (2006.01)
*B60Q 1/14* (2006.01)
(Continued)

(52) U.S. Cl.
CPC .................. *G06T 7/80* (2017.01); *B60Q 1/14* (2013.01); *G01B 11/26* (2013.01); *H05B 47/105* (2020.01);
(Continued)

(58) Field of Classification Search
CPC ............. G06T 7/80; G06T 2207/30244; G06T 2207/30252; B60Q 1/14; B60Q 1/10;
(Continued)

(56) References Cited

U.S. PATENT DOCUMENTS 11,242,052 B2 * 2/2022 Kaita ....................... B62J 45/41
2004/0133376 A1 7/2004 Uffenkamp et al.
(Continued)

FOREIGN PATENT DOCUMENTS

EP 1375249 A1 1/2004
EP 3014239 B1 4/2019
(Continued)

OTHER PUBLICATIONS

Extended European Search Report issued on Jan. 31, 2025, in corresponding European Patent Application No. 23770417.6. (8 pages).

(Continued)

*Primary Examiner* — Isiaka O Akanbi
(74) *Attorney, Agent, or Firm* — BUCHANAN, INGERSOLL & ROONEY PC

(57) ABSTRACT

An attitude determining device outputs a notification signal if, in an image that an imaging device has captured of a predetermined attitude determining pattern formed by a light distribution variable lamp that illuminates a region ahead of a vehicle with light, a position of the attitude determining pattern in a direction about an optical axis of the imaging device deviates from a normal position by no less than a predetermined amount.

6 Claims, 4 Drawing Sheets

1

(51) Int. Cl.
*G06T 7/80* (2017.01)
*H05B 47/105* (2020.01)

(52) U.S. Cl.
CPC ............... *G06T 2207/30244* (2013.01); *G06T 2207/30252* (2013.01)

(58) Field of Classification Search
CPC .............. B60Q 11/00; B60Q 2300/136; G01B 11/26; H05B 47/105; G01M 11/062; G01M 11/065
USPC ...................... 356/121, 124, 402, 124.5, 127
See application file for complete search history.

(56) References Cited

U.S. PATENT DOCUMENTS

| | | | | |
|---|---|---|---|---|
| 2013/0218413 | A1* | 8/2013 | Tanaka | B60Q 1/143<br>701/36 |
| 2015/0085514 | A1 | 3/2015 | Yagi | |
| 2016/0264042 | A1* | 9/2016 | Ito | G01M 11/068 |
| 2017/0154224 | A1* | 6/2017 | Torii | G06T 3/60 |
| 2018/0066985 | A1 | 3/2018 | Gut | |
| 2018/0158213 | A1* | 6/2018 | Shen | G06T 7/80 |
| 2018/0372869 | A1* | 12/2018 | Namba | G01S 17/18 |
| 2019/0016274 | A1* | 1/2019 | Namba | G01C 3/06 |
| 2019/0128497 | A1* | 5/2019 | Tessnow | F21S 41/151 |
| 2019/0135165 | A1 | 5/2019 | Wilks et al. | |
| 2021/0109204 | A1 | 4/2021 | Liao et al. | |
| 2022/0402423 | A1 | 12/2022 | Hori | |
| 2023/0013166 | A1* | 1/2023 | Kawabata | H05B 45/325 |
| 2023/0019153 | A1 | 1/2023 | Maruyama et al. | |
| 2023/0096367 | A1* | 3/2023 | Mano | H05B 47/20<br>362/543 |
| 2023/0322154 | A1* | 10/2023 | Sumitani | B60Q 1/143<br>362/465 |

FOREIGN PATENT DOCUMENTS

| | | | |
|---|---|---|---|
| EP | 3209992 | B1 | 7/2019 |
| JP | 2015064964 | A | 4/2015 |
| WO | 2021145157 | A1 | 7/2021 |
| WO | 2021193702 | A1 | 9/2021 |

OTHER PUBLICATIONS

International Preliminary Report on Patentability (Form PCT/IB/373) and the Written Opinion of the International Searching Authority (Form PCT/ISA/237) issued on Sep. 10, 2024, by the International Bureau of WIPO in corresponding International Application No. PCT/JP2023/007652. (8 pages).
International Search Report (Form PCT/ISA/210) issued on Apr. 4, 2023, by the Japanese Patent Office in corresponding International Application No. PCT/JP2023/007652. (6 pages).

* cited by examiner

ATTITUDE DETERMINING DEVICE, VEHICLE LAMP SYSTEM, ATTITUDE DETERMINING METHOD, AND CALIBRATION METHOD

CROSS-REFERENCE TO RELATED APPLICATIONS

This application is the continuation of International Patent Application No. PCT/JP2023/007652, filed on Mar. 1, 2023, which claims the benefit of priority from Japanese Patent Application No. 2022-040365, filed on Mar. 15, 2022, the entire content of each of which is incorporated herein by reference.

BACKGROUND

Field of the Invention

The present invention relates to attitude determining devices, vehicle lamp systems, attitude determining methods, and calibration methods.

Description of the Related Art

Adaptive driving beam (ADB) control is being proposed that dynamically and adaptively controls light distribution patterns based on the circumstances surrounding the vehicle. ADB control detects, with a camera, the presence of a front vehicle that should not be illuminated with high-illuminance light and blocks the region of the light that corresponds to the front vehicle (see, for example, Patent Literature 1). Blocking the region of the light that corresponds to the front vehicle can reduce glare caused on the driver of the front vehicle and can also improve the visibility for the driver of the host vehicle.

Patent Literature 1: JP 2015-064964

In the light distribution control like the ADB control described above in which camera images are used, the lamp and the imaging device need to be properly positioned to each other in advance. Typically, the lamp and the imaging device are calibrated therebetween through software in the production line of the lamp. In particular, in the case of a lamp with a built-in camera where the lamp and an imaging device are housed in a single housing, it is desirable to execute the above calibration in the production line of the lamp. This calibration should desirably be simple, from the standpoint of reducing the cost for a system that performs light distribution control using camera images or of improving the production lead time.

SUMMARY OF THE INVENTION

The present invention has been made in view of such circumstances and is directed, in one aspect, to providing a technique for simplifying calibration between a lamp and an imaging device.

To solve the problem described above, one aspect of the present invention provides an attitude determining device. This device is configured to output a notification signal if, in an image that an imaging device has captured of a predetermined attitude determining pattern formed by a light distribution variable lamp that illuminates a region ahead of a vehicle with light, a position of the attitude determining pattern in a direction about an optical axis of the imaging device deviates from a normal position by no less than a predetermined amount.

Another aspect of the present invention provides a vehicle lamp system. This system includes a light distribution variable lamp that illuminates a region ahead of a vehicle with light, an imaging device that captures an image of the region ahead of the vehicle, and the attitude determining device of the aspect above.

Another aspect of the present invention provides an attitude determining method. This method includes forming an attitude determining pattern by a light distribution variable lamp that illuminates a region ahead of a vehicle with light, capturing an image of the attitude determining pattern by an imaging device, and outputting a notification signal if, in the image captured by the imaging device, a position of the attitude determining pattern in a direction about an optical axis of the imaging device deviates from a normal position by no less than a predetermined amount.

Another aspect of the present invention provides a calibration method of calibrating between a light illumination range of a light distribution variable lamp that illuminates a region ahead of a vehicle with light and an imaging range of an imaging device that captures an image of the region ahead of the vehicle. This method includes excluding from being calibrated a set of the light distribution variable lamp and the imaging device for which the notification signal is output in the attitude determining method of the aspect above; and for a set of a light distribution variable lamp and an imaging device to be calibrated, executing calibration excluding calibrating an attitude in a direction about an optical axis of the imaging device.

It is to be noted that any combinations of the constituent elements above or an embodiment obtained by converting what is expressed by the present invention between a method, an apparatus, a system, and so forth is also valid as an aspect of the present invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
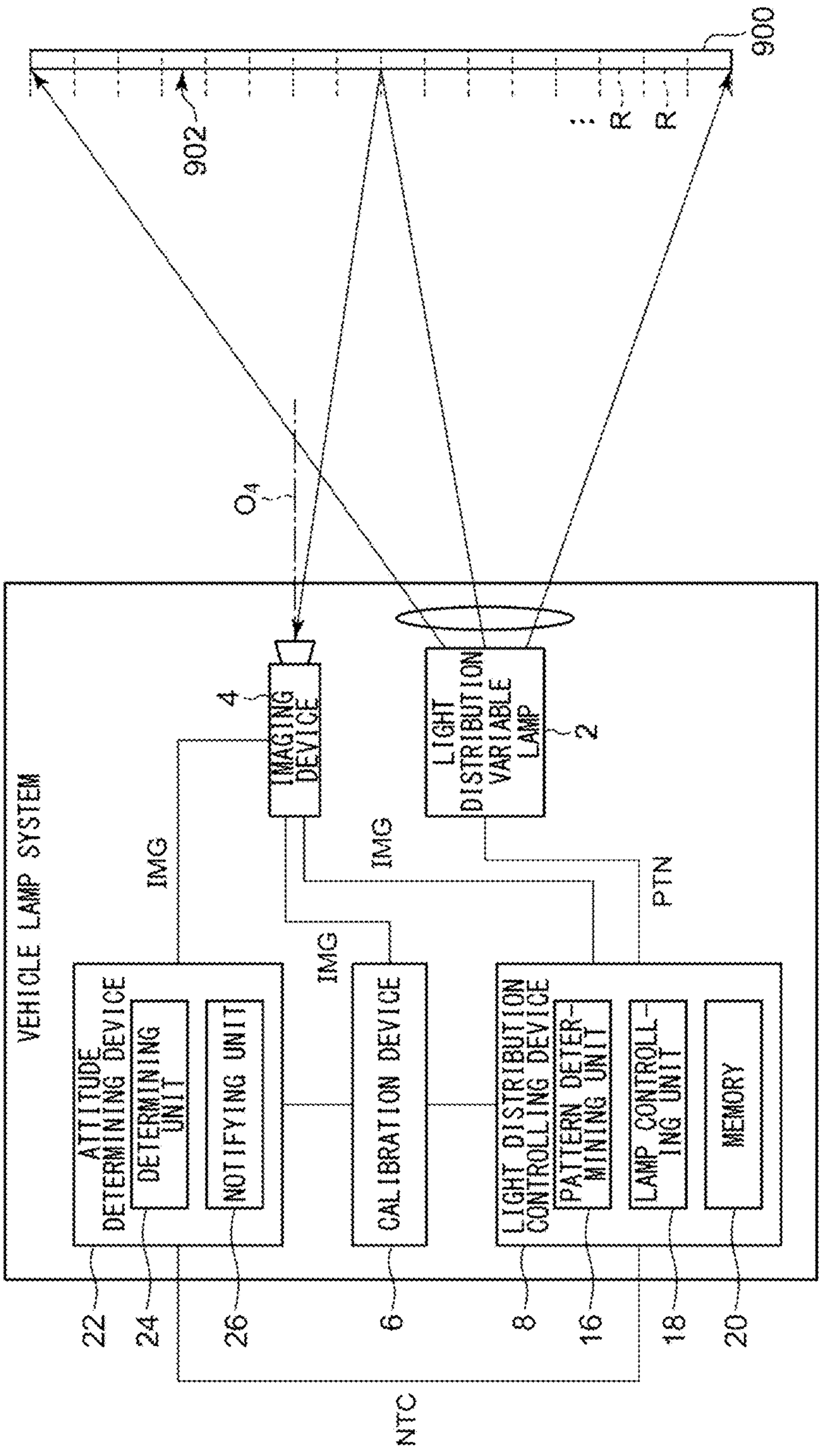
FIG. 1 is a block diagram of a vehicle lamp system.

Hereinafter, the present invention will be described based on some exemplary embodiments with reference to the drawings. The embodiments are illustrative in nature and are not intended to limit the invention. Not all the features and combinations thereof described of the embodiments are necessarily essential to the invention. Identical or equivalent constituent elements, members, and processes illustrated in the drawings are given identical reference characters, and their duplicate description will be omitted as appropriate.

The scales and shapes of the components illustrated in the drawings are set merely for convenience in order to facilitate description and are not to be interpreted as limiting, unless specifically indicated otherwise. When terms such as "first" and "second" are used in the present specification or in the claims, these terms do not indicate the order or the level of importance in any way and are merely used to distinguish a given component from another component, unless specifically indicated otherwise. Part of a member that is not important in describing the embodiments is omitted from the drawings.

FIG. 1 is a block diagram of a vehicle lamp system 1. FIG. 1 depicts some of the constituent elements of the vehicle lamp system 1 in the form of functional blocks. These functional blocks are implemented, in terms of their hardware configuration, by elements and/or circuits, including a CPU and a memory of a computer, or implemented, in terms of their software configuration, by a computer program or the like. It is to be appreciated by a person skilled in the art that these functional blocks can be implemented in a variety of forms through combinations of hardware and software.

The vehicle lamp system 1 includes a light distribution variable lamp 2, an imaging device 4, an attitude determining device 22, a calibration device 6, and a light distribution controlling device 8. The light distribution variable lamp 2, the imaging device 4, the attitude determining device 22, the calibration device 6, and the light distribution controlling device 8 may all be contained within a single housing, or some of these members may be provided outside such a housing.

For example, the light distribution variable lamp 2, the imaging device 4, the attitude determining device 22, the calibration device 6, and the light distribution controlling device 8 are housed in a lamp room. The lamp room is defined by a lamp body having an opening that opens to the front of the vehicle and a light-transmissive cover attached so as to cover the opening of the lamp body. The imaging device 4, the attitude determining device 22, the calibration device 6, and the light distribution controlling device 8 may be provided outside the lamp room, such as in the vehicle. In this case, the imaging device 4 may be an onboard camera. The attitude determining device 22, the calibration device 6, and the light distribution controlling device 8 may be, for example, entirely or partly constituted by a vehicle ECU.

The light distribution variable lamp 2 is capable of illuminating a region ahead of the host vehicle with a visible light beam of a variable intensity distribution. The light distribution variable lamp 2 is enabled to vary, independently of each other, the illuminance of light in a plurality of illuminated individual regions R arrayed ahead of the vehicle. The plurality of individual regions R are arrayed, for example, in a matrix. The light distribution variable lamp 2 receives information instructing on a light distribution pattern PTN from the light distribution controlling device 8 and emits a visible light beam having an intensity distribution corresponding to the light distribution pattern PTN. Thus, the light distribution pattern PTN is formed ahead of the host vehicle. A light distribution pattern PTN can be understood as a two-dimensional illuminance distribution of an illumination pattern 902 that the light distribution variable lamp 2 forms on a screen 900 (imaginary vertical screen) ahead of the host vehicle.

There is no particular limitation on the configuration of the light distribution variable lamp 2, and the light distribution variable lamp 2 includes, for example, a plurality of light sources arrayed in a matrix and a lighting circuit that drives the light sources to turn them on independently of each other. Some preferred examples of such a light source include a semiconductor light source, such as a light-emitting diode (LED), a laser diode (LD), or an organic or inorganic electroluminescence (EL) light source. The light sources are mapped to the respective individual regions R, and each individual region R is individually illuminated with light from the corresponding light source. The light distribution variable lamp 2 has a resolution, that is, a light distribution resolving power of, for example, from 1,000 pixels to 2,000,000 pixels. The resolution of the light distribution variable lamp 2 means the number of the unit regions, of a light distribution pattern PTN, whose illuminance can be varied independently of each other.

In order to form an illuminance distribution corresponding to a light distribution pattern PTN, the light distribution variable lamp 2 may include, for example but not limited to, a pattern forming device of a matrix type, such as a digital mirror device (DMD) or a liquid crystal device, or a pattern forming device of a scan optics type that scans the region ahead of the host vehicle with light from the light sources.

The imaging device 4 has a sensitivity to a visible light range and repeatedly captures an image of the region ahead of the host vehicle. The imaging device 4 captures an image of reflected light of a visible light beam reflected from an object ahead of the vehicle. The imaging device 4 also captures an image of light from a front vehicle, which includes a leading vehicle and an oncoming vehicle. An image IMG that the imaging device 4 generates is sent at least to the attitude determining device 22 when an attitude determining process is to be performed, sent at least to the calibration device 6 when calibration is to be performed, or sent at least to the light distribution controlling device 8 when light distribution control is to be executed.

An image IMG that the attitude determining device 22, the calibration device 6, or the light distribution controlling device 8 acquires from the imaging device 4 may be RAW image data or image data subjected to predetermined image processing by the imaging device 4. When the attitude determining device 22, the calibration device 6, or the light distribution controlling device 8 receives image data resulting from subjecting RAW image data generated by the imaging device 4 to image processing performed by a processing device other than the imaging device 4, this receiving also corresponds to the acquiring of an image IMG from the imaging device 4. In the following description, RAW image data and data subjected to image processing are both referred to as an "image IMG" with no distinction therebetween.

The attitude determining device 22 determines the attitude of the imaging device 4 in the direction of rotation with an optical axis $O_4$ of the imaging device 4 serving as the axis of rotation (referred to below as the direction about the optical axis). The attitude determining device 22 can be constituted by a digital processor and may, for example, be constituted by a combination of a microcomputer including a CPU and a software program or by a field-programmable gate array (FPGA), an application specific IC (ASIC), or the like. The attitude determining device 22 includes, in one example, a determining unit 24 and a notifying unit 26. Each of these units operates as an integrated circuit constituting itself executes a program stored in a memory. Attitude determination that the attitude determining device 22 executes will be described later in detail.

The calibration device 6 executes calibration between the light illumination range of the light distribution variable lamp 2 and the imaging range of the imaging device 4. The calibration device 6 generates calibration information regarding the light illumination range and the imaging range and sends the generated calibration information to the light distribution controlling device 8. The calibration device 6 can be constituted by a digital processor and may, for example, be constituted by a combination of a microcomputer including a CPU and a software program or by a field-programmable gate array (FPGA), an application specific IC (ASIC), or the like. Calibration that the calibration device 6 executes will be described later in detail.

The light distribution controlling device 8 executes ADB control of dynamically and adaptively controlling the light distribution of the light distribution variable lamp 2 in accordance with a target present in the region ahead. The light distribution controlling device 8 can be constituted by a digital processor and may, for example, be constituted by a combination of a microcomputer including a CPU and a software program or by a field-programmable gate array (FPGA), an application specific IC (ASIC), or the like. The light distribution controlling device 8 includes, in one example, a pattern determining unit 16, a lamp controlling unit 18, and a memory 20. Each of these units operates as an integrated circuit constituting itself executes a program stored in a memory.

Calibration information generated by the calibration device 6 is stored into the memory 20. The pattern determining unit 16 performs, for example, known image processing on an image IMG acquired from the imaging device 4 and detects a target to be shaded, such as a front vehicle. The pattern determining unit 16 then determines a light distribution pattern PTN having a shaded portion to overlap the detected target to be shaded. In determining the light distribution pattern PTN, the pattern determining unit 16, using the calibration information stored in the memory 20, identifies the position coordinates of the light illumination range of the light distribution variable lamp 2 corresponding to the position coordinates of the target to be shaded in the image IMG, and sets the shaded portion at the identified position coordinates. If the light distribution variable lamp 2 is constituted, for example, by an LED array, the position coordinates of the light illumination range can be understood as the position coordinates in the LED array. The pattern determining unit 16 sends information about the determined light distribution pattern PTN to the lamp controlling unit 18.

Based on the information about the light distribution pattern PTN, the lamp controlling unit 18 instructs the light distribution variable lamp 2 to form the light distribution pattern PTN. Thus, the light distribution pattern PTN is formed ahead of the host vehicle.

Next, an attitude determining method and a calibration method according to the present embodiment will be described. Attitude determination and calibration are executed, for example, in the production line in a state in which a screen 900 is disposed at a certain distance from the light distribution variable lamp 2 and the imaging device 4.

Attitude determination is executed prior to calibration. In one example, an execution instructing signal for attitude determination is sent from the outside to the attitude determining device 22. In response to receiving the execution instructing signal, the attitude determining device 22 instructs the light distribution controlling device 8 to form a predetermined attitude determining pattern PTNp. In response, the light distribution controlling device 8 controls the light distribution variable lamp 2 so as to form the attitude determining pattern PTNp. As a result, the attitude determining pattern PTNp is formed on the screen 900 by the light distribution variable lamp 2.

Figure 2:
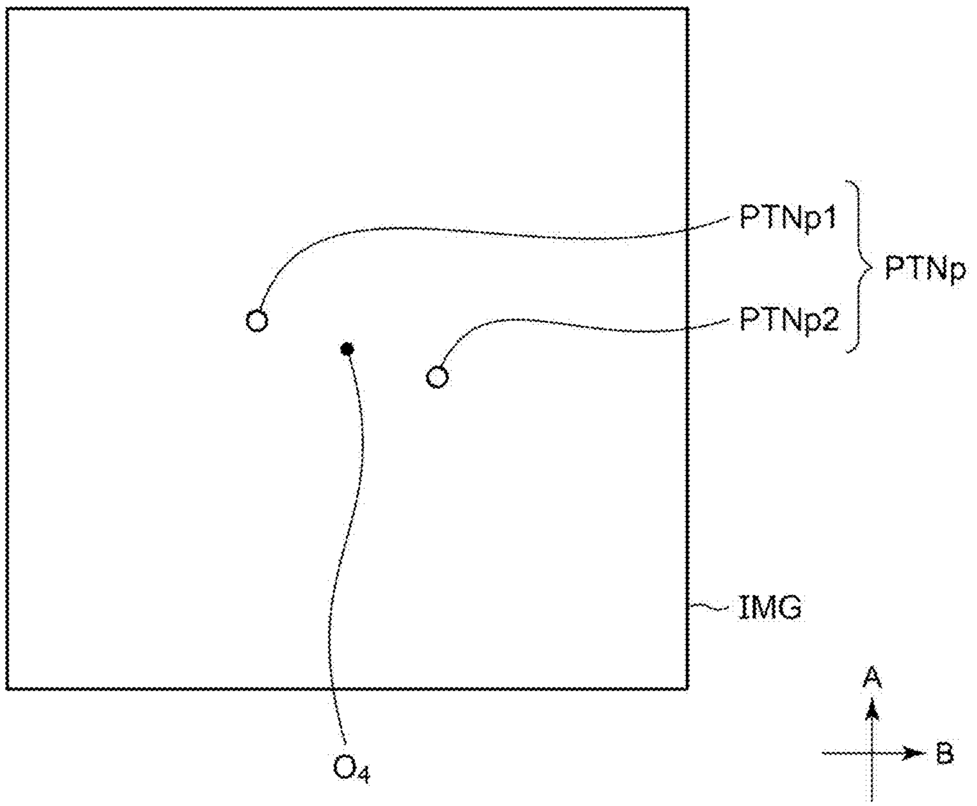
FIG. 2 is a schematic diagram of an image capturing an attitude determining pattern.

An image of the attitude determining pattern PTNp formed on the screen 900 is captured by the imaging device 4. FIG. 2 is a schematic diagram of an image IMG capturing an attitude determining pattern PTNp. Preferably, an attitude determining pattern PTNp includes at least two luminous points or at least one line. The attitude determining pattern PTNp according to the present embodiment includes a first luminous point PTNp1 and a second luminous point PTNp2. The first luminous point PTNp1 and the second luminous point PTNp2 are offset from each other in a first direction A as well as in a second direction B. The first direction A and the second direction B are orthogonal to each other. For example, the first direction A is the up-down direction, and the second direction B is the right-left direction. Herein, an attitude determining pattern PTNp may include three or more luminous points or a plurality of lines. For example, an attitude determining pattern PTNp may have a shape in which a plurality of straight lines meet in a lattice pattern.

Figure 3A:
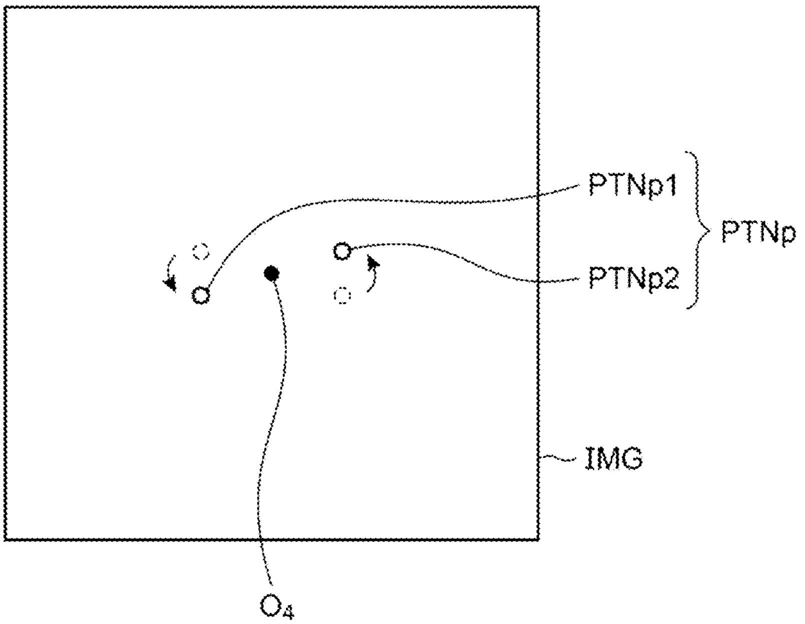
FIGS. 3A and 3B are schematic diagrams for describing a rotational position deviation of an attitude determining pattern.
Figure 3B:
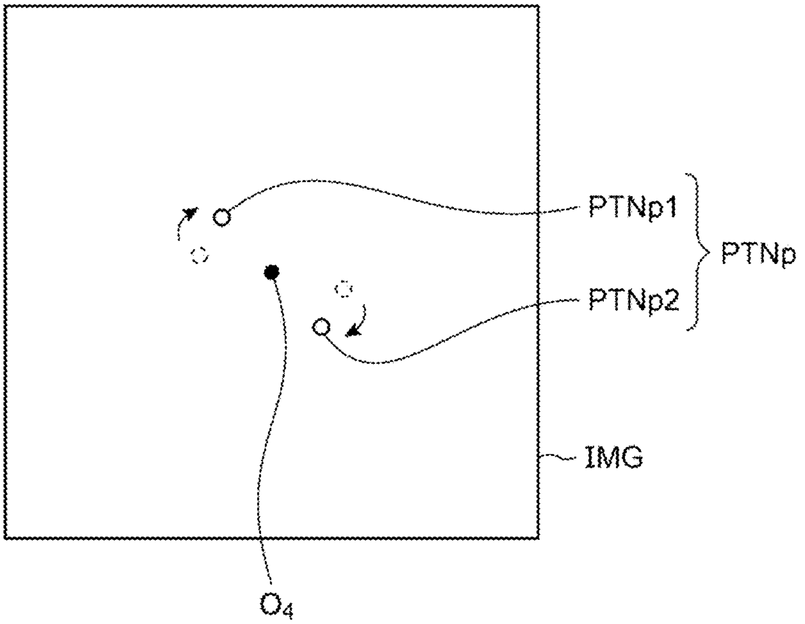

The image IMG that the imaging device 4 has captured is sent to the determining unit 24. The determining unit 24 performs a predetermined image analysis on the image IMG capturing the attitude determining pattern PTNp and identifies the position of the attitude determining pattern PTNp. Then, based on the identified position of the attitude determining pattern PTNp, the determining unit 24 determines an attitude anomaly in the direction about the optical axis of the imaging device 4, that is, in the roll direction. Specifically, the determining unit 24 determines whether the position of the attitude determining pattern PTNp in the direction about the optical axis of the imaging device 4 deviates from a normal position by a predetermined amount or more. In the following description, this deviation of an attitude determining pattern PTNp in the direction about the optical axis of the imaging device 4 is referred to as a rotational position deviation. FIGS. 3A and 3B are schematic diagrams for describing a rotational position deviation of an attitude determining pattern PTNp.

When the attitude in the direction about the optical axis of the imaging device 4 is a normal attitude as designed, the first luminous point PTNp1 and the second luminous point PTNp2 captured in an image IMG are at their normal positions, as shown in FIG. 2. In contrast, when the attitude of the imaging device 4 is rotated to the left relative to the normal attitude, the first luminous point PTNp1 and the second luminous point PTNp2 captured in an image IMG deviate from their normal positions (the positions indicated by the dashed lines) in the direction of left rotation, as shown in FIG. 3A. Meanwhile, when the attitude of the imaging device 4 is rotated to the right relative to the normal attitude, the first luminous point PTNp1 and the second luminous point PTNp2 captured in an image IMG deviate from their normal positions (the positions indicated by the dashed lines) in the direction of right rotation, as shown in FIG. 3B.

The determining unit 24 holds, in advance, information regarding the normal position of the attitude determining pattern PTNp and information regarding a threshold of the deviation amount. The threshold can be set as appropriate based on an experiment or a simulation conducted by the engineer. Herein, the threshold may include zero. In other words, a case in which the determining unit 24 does not allow even the slightest deviation may also be included. Then, the determining unit 24 detects an attitude anomaly of the imaging device 4 if the deviation amount of the positions of the first luminous point PTNp1 and the second luminous point PTNp2 in an image IMG acquired from the imaging device 4 from their normal positions is at the threshold or greater. In response to detecting the attitude anomaly of the imaging device 4, the determining unit 24 sends a signal indicating the attitude anomaly to the notifying unit 26.

In response to receiving the signal indicating the attitude anomaly from the determining unit 24, the notifying unit 26 output a notification signal NTC. In one example, a notification signal NTC is a signal that causes the light distribution variable lamp 2 corresponding to the imaging device 4 for which the notification signal NTC has been output, that is, corresponding to the imaging device 4 of which the attitude anomaly has been detected to have a lighting state different from the lighting state held before the attitude determination. Examples of "causing to have a lighting state different from a lighting state held before attitude determination" include switching the pattern from an attitude determining pattern PTNp to a predetermined notifying pattern (in one example, illuminating the entire illumination range of the light distribution variable lamp 2), causing an attitude determining pattern PTNp or a notifying pattern to blink, or turning off a formed attitude determining pattern PTNp.

In the case above, the notifying unit 26 sends a notification signal NTC to the light distribution controlling device 8. In response to receiving the notification signal NTC, the light distribution controlling device 8 controls the light illumination by the light distribution variable lamp 2 in accordance with the contents of the notification signal NTC. Herein, the notification signal NTC may be sent directly from the notifying unit 26 to the light distribution variable lamp 2. Furthermore, the notification signal NTC may be a signal that causes a predetermined external device to display an error message or to output a notification sound or an announcement.

Figure 4:
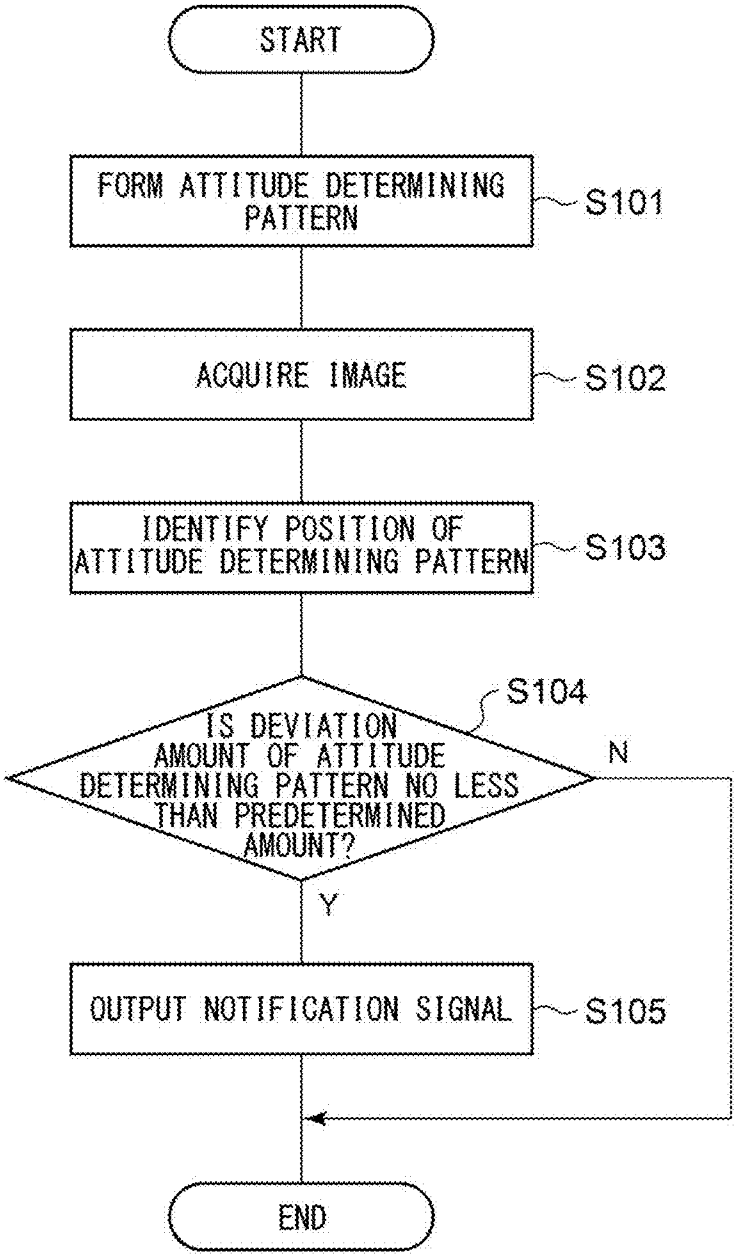
FIG. 4 is a flowchart for describing one example of attitude determination.

FIG. 4 is a flowchart for describing one example of attitude determination. This flow is executed when an instruction to execute attitude determination is made. First, the attitude determining device 22 instructs the light distribution variable lamp 2 to form an attitude determining pattern PTNp (S101). Next, the attitude determining device 22 acquires an image IMG capturing the attitude determining pattern PTNp (S102). Then, the attitude determining device 22 identifies the position of the attitude determining pattern PTNp (S103).

Then, the attitude determining device 22 determines whether the attitude determining pattern PTNp in the image IMG deviates from the normal position by a predetermined amount or more (S104). If the attitude determining pattern PTNp deviates from the normal position by the predetermined amount or more (Y at S104), the attitude determining device 22 outputs a notification signal NTC (S105) and terminates the routine. If the deviation amount of the attitude determining pattern PTNp from the normal position is smaller than the predetermined amount (N at S104), the attitude determining device 22 terminates the routine without outputting a notification signal NTC.

In this manner, the attitude determining device 22 outputs a notification signal NTC if the position of an attitude determining pattern PTNp in the direction about the optical axis of the imaging device 4 in an image IMG deviates from the normal position by a predetermined amount or more, and thus a worker can easily find out about the attitude anomaly of the imaging device 4.

After the attitude determination, calibration between the illumination range of the light distribution variable lamp 2 and the imaging range of the imaging device 4 is executed. In the calibration according to the present embodiment, the set of the light distribution variable lamp 2 and the imaging device 4 for which the notification signal NTC is output in the attitude determination described above is excluded from being calibrated. Then, on a set of a light distribution variable lamp 2 and an imaging device 4 to be calibrated, the calibration device 6 executes calibration excluding calibrating (positioning) the attitude in the direction about the optical axis of the imaging device 4.

In one example, a calibration execution instructing signal is sent to the calibration device 6 from the outside. In response to receiving the execution instructing signal, the calibration device 6 instructs a light distribution controlling device 8 that controls a light distribution variable lamp 2 to be calibrated to form a predetermined calibration pattern. This configuration makes it possible to exclude, through software, a set of a light distribution variable lamp 2 and an imaging device 4 that is not to be calibrated. The calibration device 6 can determine whether a set of an imaging device 4 and a light distribution variable lamp 2 is to be calibrated, by receiving a signal indicating a determination result or a notification signal NTC from the attitude determining device 22. Herein, a set of a light distribution variable lamp 2 and an imaging device 4 that is not to be calibrated may be physically removed from the production line by a worker.

In response to receiving an instruction from the calibration device 6, the light distribution controlling device 8 controls the light distribution variable lamp 2 to form a calibration pattern. As a result, the calibration pattern is formed on the screen 900 by the light distribution variable lamp 2. A conventionally known pattern can be used as a calibration pattern. An image of the calibration pattern formed on the screen 900 is captured by the imaging device 4. The image IMG that the imaging device 4 has captured is sent to the calibration device 6.

The calibration device 6 performs calibration between the position coordinates of the image IMG and the position coordinates of the light illumination range of the light distribution variable lamp 2 with the position of the calibration pattern in the image IMG serving as the target. At this point, calibration of the attitude in the direction about the optical axis of the imaging device 4 is omitted, and calibration in the up-down direction or in the right-left direction is performed. As a result, calibration information is generated. The generated calibration information is stored into the memory 20.

As described thus far, the attitude determining device 22 according to the present embodiment outputs a notification signal NTC if, in an image IMG that the imaging device 4 has captured of a predetermined attitude determining pattern PTNp formed by the light distribution variable lamp 2 that illuminates the region ahead of the vehicle with light, the position of the attitude determining pattern PTNp in the direction about the optical axis of the imaging device 4 deviates from the normal position by a predetermined amount or more.

When the imaging device 4 is mounted to a housing, the imaging device 4 can be mounted in an attitude that is rotated in the direction about the optical axis relative to the normal attitude. When this mounting error in the direction of rotation is to be corrected in a software-wise approach in calibration, the computation process of the calibration can become excessively complex. The increased complexity of calibration can lead to the increased cost of the vehicle lamp system 1. In one method conceivable for preventing the computation process of calculation from becoming complex, a worker visually checks the mounting attitude of every imaging device 4 and manually corrects the attitude. This case, however, creates an increase in time and labor needed for calibration, which in turn may lead to a decrease in the production lead time or throughput of the vehicle lamp system 1.

In contrast, the attitude determining device 22 of the present embodiment outputs a notification signal NTC if the mounting error of an imaging device 4 in the direction of rotation exceeds a permissible range. This configuration allows a worker to easily find out about the attitude anomaly of the imaging device 4 and to promptly take action against the attitude anomaly. Thus, calibration between the light distribution variable lamp 2 and the imaging device 4 can be simplified. Furthermore, since the attitude anomaly only in the direction about the optical axis of the imaging device 4 is determined in attitude determination, the attitude determination can be kept from becoming complex.

The calibration method according to the present embodiment includes excluding from being calibrated a set of a light distribution variable lamp 2 and an imaging device 4 for which a notification signal NTC is output, and for a set of a light distribution variable lamp 2 and an imaging device 4 to be calibrated, executing calibration excluding calibrating the attitude in a direction about the optical axis of the imaging device 4. This method can further simplify the calibration.

The attitude determining pattern PTNp according to the present embodiment includes at least two luminous points or at least one line. This configuration makes it possible to more accurately detect a rotational position deviation of the attitude determining pattern PTNp and in turn the attitude anomaly of the imaging device 4. The notification signal NTC is a signal that causes the light distribution variable lamp 2 corresponding to the imaging device 4 for which the notification signal NTC is output to have a lighting state different from the lighting state held before the attitude determination. This configuration makes it possible to notify a worker of the attitude anomaly of the imaging device 4 using existing equipment (light distribution variable lamp 2).

Thus far, some embodiments according to the present invention have been described in detail. The embodiments described above merely illustrate some specific examples for implementing the present invention. The contents of the embodiments do not limit the technical scope of the present invention, and a number of design changes, including modifications, additions, and deletions of constituent elements, can be made within the scope that does not depart from the sprit of the invention set forth in the claims. A new embodiment resulting from adding a design change has advantageous effects of embodiments combined as well as the advantageous effects of the modification. With regard to the embodiments described above, the expressions "according to the present embodiment," "in the present embodiment," and so on are added for emphasis to the content that can be subjected to a design change as described above, but such a design change is also permitted on the content without these expressions. A desired combination of the constituent elements described above is also valid as an aspect of the present invention. Hatching added along a section in the drawings does not limit the material of such with hatching.

The invention according to the embodiments described above may be identified by the Items indicated below.

First Item

An attitude determining device (22) configured to:

output a notification signal (NTC) if, in an image (IMG) that an imaging device (4) has captured of a predetermined attitude determining pattern (PTNp) formed by a light distribution variable lamp (2) that illuminates a region ahead of a vehicle with light, a position of the attitude determining pattern (PTNp) in a direction about an optical axis ($O_4$) of the imaging device (4) deviates from a normal position by no less than a predetermined amount.

Second Item

The attitude determining device (22) according to First Item, wherein the attitude determining pattern (PTNp) includes at least two luminous points (PTNp1, PTNp2) or at least one line.

Third Item

The attitude determining device (22) according to First Item or Second Item, wherein the notification signal (NTC) is a signal that causes the light distribution variable lamp (2) corresponding to the imaging device (4) for which the notification signal (NTC) is output to have a lighting state different from a lighting state held before attitude determination.

Fourth Item

A vehicle lamp system (1), comprising:

a light distribution variable lamp (2) that illuminates a region ahead of a vehicle with light;

an imaging device (4) that captures an image of the region ahead of the vehicle; and the attitude determining device (22) according to any one of First Item to Third Item.

Fifth Item

An attitude determining method, comprising:

forming an attitude determining pattern (PTNp) by a light distribution variable lamp (2) that illuminates a region ahead of a vehicle with light;

capturing an image of the attitude determining pattern (PTNp) by an imaging device (4); and outputting a notification signal (NTC) if, in the image (IMG) captured by the imaging device (4), a position of the attitude determining pattern (PTNp) in a direction about an optical axis ($O_4$) of the imaging device (4) deviates from a normal position by no less than a predetermined amount.

Sixth Item

A calibration method of calibrating between a light illumination range of a light distribution variable lamp (2) that illuminates a region ahead of a vehicle with light and an imaging range of an imaging device (4) that captures an image of the region ahead of the vehicle, the calibration method comprising:

excluding from being calibrated a set of the light distribution variable lamp (2) and the imaging device (4) for which the notification signal (NTC) is output in the attitude determining method according to Fifth Item; and for a set of a light distribution variable lamp (2) and an imaging device (4) to be calibrated, executing calibration excluding calibrating an attitude in a direction about an optical axis of the imaging device (4).

What is claimed is:

1. An attitude determining method, comprising:

forming an attitude determining pattern by a light distribution variable lamp that illuminates a with light whereby the attitude determining pattern is formed on a screen disposed at a certain distance from the light distribution variable lamp;

capturing an image of the attitude determining pattern by an imaging device; and outputting a notification signal if, in the image captured by the imaging device, a position of the attitude determining pattern in a direction of rotation with an optical axis of the imaging device deviates from a normal position by no less than a predetermined amount.

2. The attitude determining method according to claim 1, wherein the attitude determining pattern includes at least two luminous points or at least one line.

3. The attitude determining method according to claim 2, wherein the notification signal is a signal that causes the light distribution variable lamp corresponding to the imaging device for which the notification signal is output to have a lighting state different from a lighting state held before attitude determination.

4. The attitude determining method according to claim 1, wherein the notification signal is a signal that causes the light distribution variable lamp corresponding to the imaging device for which the notification signal is output to have a lighting state different from a lighting state held before attitude determination.

5. A lamp system, comprising:

a light distribution variable lamp that illuminates a region with light;

an imaging device that captures an image of the region; and an attitude determining device configured to perform the attitude determining method according to claim 1.

6. A calibration method of calibrating between a light illumination range of a light distribution variable lamp that illuminates a region with light and an imaging range of an imaging device that captures an image of the region, the calibration method comprising:

excluding from being calibrated a set of the light distribution variable lamp and the imaging device for which the notification signal is output in the attitude determining method according to claim 1; and for a set of a light distribution variable lamp and an imaging device to be calibrated, executing calibration excluding calibrating an attitude in a direction of rotation with an optical axis of the imaging device.

* * * * *